United States Patent
Chen et al.

(10) Patent No.: US 11,681,099 B2
(45) Date of Patent: Jun. 20, 2023

(54) METHOD TO BUILD MONOLITHIC RING-SHAPE FREQUENCY CONVERTER ON POTASSIUM TITANYL PHOSPHATE WATER

(71) Applicant: SHANDONG NORMAL UNIVERSITY, Jinan (CN)

(72) Inventors: Chen Chen, Jinan (CN); Zhanghua Han, Jinan (CN)

(73) Assignee: SHANDONG NORMAL UNIVERSITY, Jinan (CN)

( * ) Notice: Subject to any disclaimer, the term of this patent is extended or adjusted under 35 U.S.C. 154(b) by 0 days.

(21) Appl. No.: 17/947,269

(22) Filed: Sep. 19, 2022

(65) Prior Publication Data
US 2023/0010459 A1 Jan. 12, 2023

(30) Foreign Application Priority Data
Nov. 3, 2021 (CN) .......................... 202111293330.0

(51) Int. Cl.
*G02B 6/136* (2006.01)
*G02F 1/355* (2006.01)
*G02B 6/12* (2006.01)

(52) U.S. Cl.
CPC ........... *G02B 6/136* (2013.01); *G02F 1/3553* (2013.01); *G02B 2006/12176* (2013.01)

(58) Field of Classification Search
CPC ............... G02B 6/136; G02B 6/29338; G02B 6/29341; G02B 6/29343; G02F 1/3553
See application file for complete search history.

(56) References Cited

U.S. PATENT DOCUMENTS

| 5,042,895 A * | 8/1991 | Chouinard | G02F 1/225 |
| | | | 385/132 |
| 5,109,462 A * | 4/1992 | Watanabe | G02F 1/377 |
| | | | 359/332 |
| 2017/0351027 A1* | 12/2017 | Reano | G02B 6/12 |

FOREIGN PATENT DOCUMENTS

| CN | 1424597 A | 6/2003 |
| CN | 1729415 A | 2/2006 |
| CN | 101201435 A | 6/2008 |
| CN | 101943768 A | 1/2011 |
| CN | 101950047 A * | 1/2011 |

(Continued)

*Primary Examiner* — Michael Stahl

(57) ABSTRACT

The present invention provides a method for fabricating KTP nonlinear racetrack micro-ring resonator, composed of six steps: KTP wafer processing, ion implantation, electron beam exposure, subsequent processing, reactive ion etching and final processing. A thin-film waveguide structure similar to the on-insulator lithium niobate thin-film can be achieved through only one process of ion implantation, which enables significantly simplified procedure, shortened time, and reduced cost. Meanwhile, the KTP micro-ring resonator produced according to the present invention has an optical damage threshold several times higher than the existing lithium niobate micro-ring resonator. It can output nonlinear frequency converted light to the power of milliwatts, and suitable for the case where both the input and output optical signals are pulsed lasers. Since Ion implantation, electron beam exposure, metal evaporation deposition, and reactive ion etching are all relatively developed micro-nano machining technologies, the present invention has wonderful operability and repeatability.

6 Claims, 6 Drawing Sheets

(56) References Cited

FOREIGN PATENT DOCUMENTS

| | | |
|---|---|---|
| CN | 103199004 A | 7/2013 |
| CN | 103871956 A | 6/2014 |
| CN | 108646329 A | 10/2018 |
| CN | 110333637 A | 10/2019 |
| LU | 501798 B1 * | 10/2022 |

* cited by examiner

METHOD TO BUILD MONOLITHIC RING-SHAPE FREQUENCY CONVERTER ON POTASSIUM TITANYL PHOSPHATE WAFER

CROSS-REFERENCE TO RELATED APPLICATIONS

This application claims the benefit of priority from Chinese Patent Application No. 202111293330.0, filed on Nov. 3, 2021. The content of the aforementioned application, including any intervening amendments thereto, is incorporated herein by reference in its entirety.

TECHNICAL FIELD

The present invention relates to the field of ion beam material modification, micro-nano machining and integrated optics, and in particular to a method for fabricating KTP nonlinear racetrack micro-ring resonators.

BACKGROUND

The micro-ring resonator is an element of integrated optics, which contains at least one closed ring-shaped optical path, enabling light to circulate back and forth. Light of a specific wavelength is continuously enhanced in the micro-ring resonator due to the resonance, i.e., the constructive interference.

At present, micro-ring resonators are mostly applied in silicon-based integrated optics, mainly fabricated on materials such as silicon, silicon dioxide, and silicon carbide. This is due to the relatively advanced and mature processing technology of silicon-based materials. The photolithography and subsequent reactive ion etching technology, widely used in the processing of silicon-based integrated electric circuit chips, can be partially or completely migrated to the processing of silicon-based integrated optical devices.

Although the existing silicon-based micro-ring resonators are already sophisticated, the silicon-based materials generally do not have apparent second-order nonlinear frequency response materials. The functions of silicon-based micro-ring resonators currently have been limited to few areas, such as frequency domain filtering (frequency selection), and sensing.

If the structural advantages of the micro-ring resonator and the functional advantages of nonlinear optical materials are combined, nonlinear optical frequency conversion could be realized in the produced nonlinear micro-ring structure. A successful case is the nonlinear waveguide micro-ring resonator fabricated in an on-insulator lithium niobate film. However, as a material with excellent nonlinear performance, lithium niobate crystal also has several defects that cannot be ignored. For example, its light damage threshold (the maximum light power can be stand by a unit area) is low, and the ability to resist photorefraction (change in refractive index caused by light irradiation) is weak. This determines that the micro-ring resonator with lithium niobate as the base material is not suitable for high power scenarios. Therefore, almost all reported powers of radiations generated by the nonlinear frequency conversion of lithium niobate micro-ring resonators are only in the order of microwatts ($\mu W$). Moreover, to produce lithium niobate on insulator (LNOI) thin film which is used to prepare lithium niobate micro-ring resonators, multiple steps are required, including ion implantation, bonding, stripping, and polishing. The procedures are complicated and time consuming.

KTP ($KTiOPO_4$, potassium titanyl phosphate) is a nonlinear optical crystal with almost equivalent excellent performance, and much greater optical damage threshold (exceeding 450 $MW/cm^2$), compared with that of lithium niobate (about 100 $MW/cm^2$). Thus, it can replace the non-linear frequency conversion function of lithium niobate, and will be more suitable for high power and pulsed laser scenarios. Therefore, the present invention proposes a method for fabricating KTP nonlinear racetrack micro-ring resonators to solve the problems existing in the prior art.

DESCRIPTION OF THE INVENTION

To solve the problems above, the present invention provides a method for fabricating KTP nonlinear racetrack micro-ring resonators. It will break the limitation of the output power for frequency converted radiation of the existing lithium niobate nonlinear micro-ring resonators, and extend the application range of the nonlinear micro-ring resonators to the scenarios of high power and pulsed laser. Meanwhile, it will greatly simplify the processing procedure of the nonlinear micro-ring resonator, shorten the manufacturing time and reduce the manufacturing cost.

The present invention, method for fabricating KTP nonlinear racetrack micro-ring resonator, will be realized through the following technical solutions, including 6 main steps.

Step 1: KTP Wafer Processing

First, perform surface polishing operations on the cut KTP wafer. Then, clean the wafer, and store it for later use.

Step 2: Ion Implantation

Take out the spare KTP wafer in step 1, accelerate ions by an ion accelerator, and implant them into KTP wafer. After ion implantation, an isolated layer with decreased refractive index can be formed at a depth of several microns below the surface of the KTP wafer, the part above the isolated layer is the waveguide layer.

Step 3: Electron Beam Exposure

Spin-coat a layer of photoresist on the surface of the KTP wafer, transfer the two-dimensional pattern of the micro-ring resonator to the photoresist, with an electron beam exposure equipment, to achieve the sample to be processed.

Step 4: Subsequent Processing

Deposit a layer of metal on the sample with an evaporation deposition coating system. Soak and clean the sample with pure acetone to remove excess photoresist, to transfer the two-dimensional pattern of the micro-ring resonator to the metal and form a metal mask plated on the sample.

Step 5: Reactive Ion Etching

Perform etching on the sample plated with the metal mask from top to bottom using a reactive ion etching equipment. Since the micro-ring part is covered by a metal mask, and the etching rate of the reactive ions on the metal mask is significantly lower than that of the KTP crystal, reactive ion etching can only remove little fraction of the metal mask and parts of crystal other than the micro-ring.

Step 6: Final Processing

Dissolve the remaining metal mask with a chemical corrosion solution; the remaining part of ion-implanted KTP crystal is a micro-ring resonator structure.

A further improvement is that: in step 2, the type of ion is Carbon ion or Oxygen ion.

A further improvement is that: in step 2, "several microns" means 5-10 microns.

A further improvement is that: in step 3, the thickness of the photoresist is 300-600 nm.

A further improvement is that: in step 4, the metal is Aluminum or Chromium.

A further improvement is that: in step 5, reactive ions are the mixed gas of argon and sulfur hexafluoride.

A further improvement is that: in step 6, the chemical corrosion solution is one of hydrogen peroxide (to dissolve aluminum) or a mixed solution of 200 grams of cerium ammonium nitrate, 35 milliliters of acetic acid and 1 liter of water (to dissolve Chromium).

The beneficial effects of the present invention are:

By this method, only one procedure (ion implantation) is needed to achieve the thin film waveguide structure similar to the on-insulator lithium niobate thin film material. Thereby, the production process can be greatly simplified, the time shortened, and the cost significantly reduced. Compared with the existing lithium niobate nonlinear micro-ring resonator, the KTP nonlinear micro-ring resonator finally prepared by the present invention has an obviously higher optical damage threshold. It can output nonlinear frequency converted light to the power of milliwatts, and suitable for the case where both the input and output optical signals are pulsed lasers.

Since Ion implantation, electron beam exposure, metal evaporation deposition, and reactive ion etching are all relatively developed micro-nano machining technologies, the present invention has wonderful operability and repeatability.

BRIEF DESCRIPTION OF THE DRAWINGS

In order to explain the embodiments of the present invention or the technical solutions in the prior art more clearly, the following will briefly introduce the figures that need to be used in the description of the embodiments or the prior procedure, the figures in the following description are only some embodiments of the present invention. For those of ordinary skill in the art, without creative work, other accompanying figures can be obtained from these figures.

FIG. 1 is a schematic diagram of the steps for the fabrication of micro-ring resonator.

FIG. 2 is a schematic two-dimensional top view of a micro-ring resonator.

FIG. 3 is a schematic diagram of the ion implantation into KTP wafer.

FIG. 4 is a schematic side view of the KTP wafer after spin-coating of photoresist.

FIG. 5 is a schematic side view of the KTP wafer after electron beam exposure.

FIG. 6 is a schematic side view of the wafer after metal evaporation deposition.

FIG. 7 is a schematic side view of the wafer after a metal mask was formed.

FIG. 8 is a schematic side view of the wafer after reactive ion etching.

FIG. 9 is a schematic side view of the wafer after the metal mask was dissolved.

FIG. 10 (b) is a schematic diagram of simulated transmission mode of 1064 nm laser in the KTP micro-ring resonator.

DETAILED DESCRIPTION OF EMBODIMENTS

The following will clearly and completely describe the technical solutions in the embodiments of the present invention with reference to the accompanying figures in the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

In the description of the present invention, it should be noted that for the terms: "center", "up", "down", "left", "right", "vertical", "horizontal", "inner", "outer", etc. the indicated azimuth or position relationship is based on the azimuth or position relationship shown in the figures. It is only for the convenience of describing the present invention and simplifying the description, rather than indicating or implying that the device or element referred to must have a specific orientation, or be constructed and operated in a specific orientation. Therefore, it cannot be understood as a limitation to the present invention. In addition, the terms: "first", "second", "third", "fourth", etc. are only used for descriptive purposes, and cannot be understood as indicating or implying relative importance.

In the description of the present invention, it should be noted that, unless otherwise clearly specified and limited, the terms "installation", "connected", and "connected" should be understood in a broad sense. For example, it can be a fixed connection, a detachable connection, or an integral connection; it can be a mechanical connection or an electrical connection; It can be direct connection, or indirect connection through a medium, and can be a connection between two components. For those of ordinary skill in the art, the specific meanings of the above-mentioned terms in the present invention can be understood according to the specific situation.

Embodiment 1

This example shows a method for fabricating a KTP nonlinear racetrack micro-ring resonator, which includes the following steps:

Step 1: KTP Wafer Processing

First, perform surface polishing operations on the cut KTP wafer. Then, clean the wafer, and store it for later use.

Step 2: Ion Implantation

Figure 1:
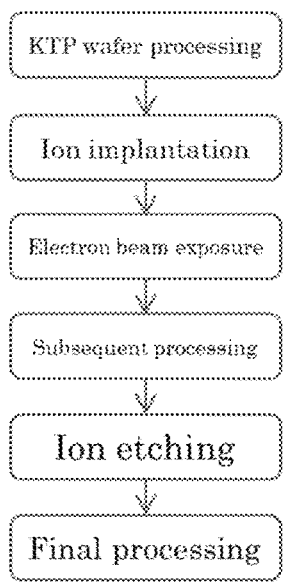
FIGS. 1-9 correspond to the example 1, FIG. 10 corresponds to the example 2.
Figure 2:
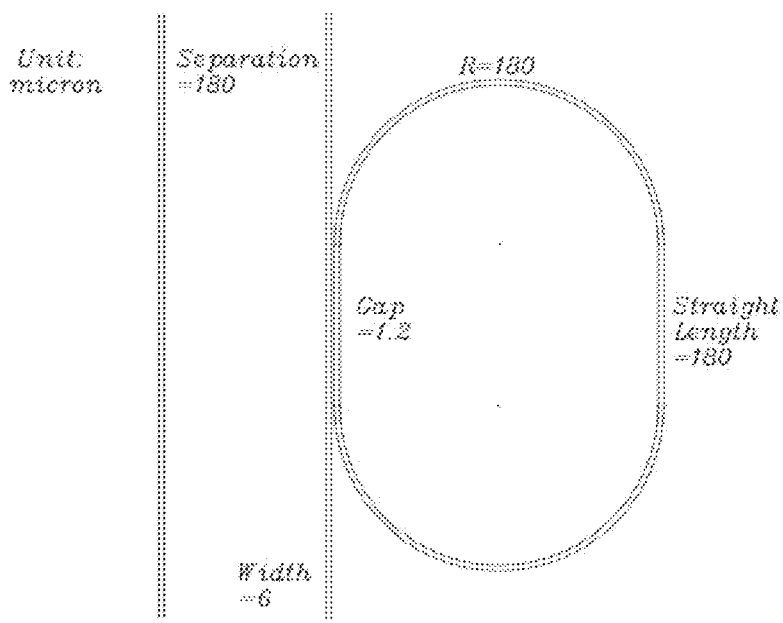
Figure 3:
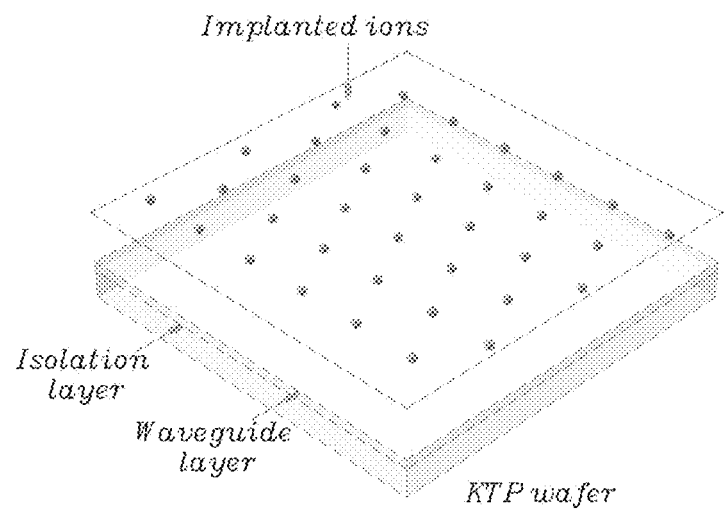

Take out the spare KTP wafer in step 1, accelerate ions by an ion accelerator, and implant them into KTP wafer, as shown in FIG. 3. After ion implantation, an isolated layer with decreased refractive index can be formed at a depth of several microns below the surface of the KTP wafer, the part above the isolated layer is the waveguide layer.

Here, the type of ion is carbon ion or oxygen ion; "several microns" means 5-10 microns.

Step 3: Electron Beam Exposure

Figure 4:
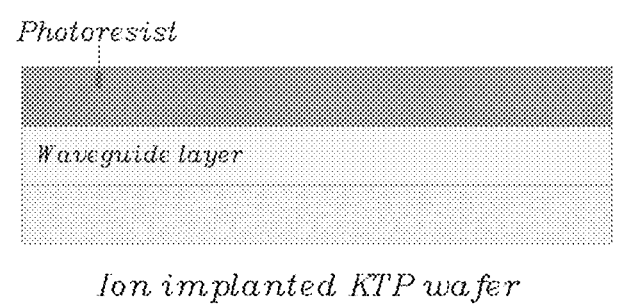
Figure 5:
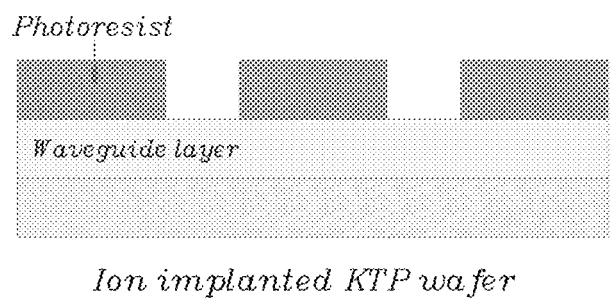

Spin-coat a layer of photoresist (950 PMMA A4) on the surface of the KTP wafer, as shown in FIG. 4, transfer the two-dimensional pattern (FIG. 5) of the micro-ring resonator to the photoresist, with an electron beam exposure equipment, to achieve the sample to be processed. After electron beam exposure, the photoresist in the area where the two-dimensional pattern of the micro-ring resonator is located is removed, leaving a gap of the same size, as shown in FIG. 5.

Here, the thickness of the photoresist is 300-600 nm.

Step 4: Subsequent Processing

Figure 6:
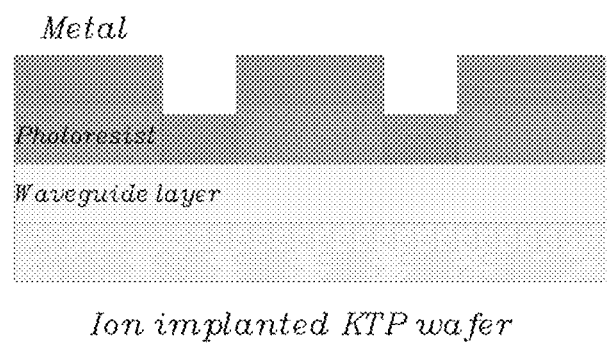
Figure 7:
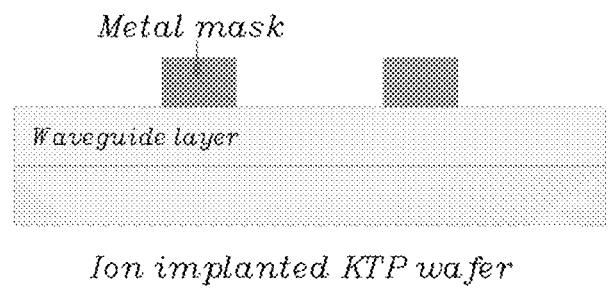

Deposit a layer of metal on the sample with an evaporation deposition coating system, as shown in FIG. 6. Soak and clean the sample with pure acetone to remove excess photoresist, to transfer the two-dimensional pattern of the micro-ring resonator to the metal and form a metal mask plated on the sample, as shown in FIG. 7.

Here, the metal is the one of Aluminum or Chromium.

Step 5: Reactive Ion Etching

Figure 8:
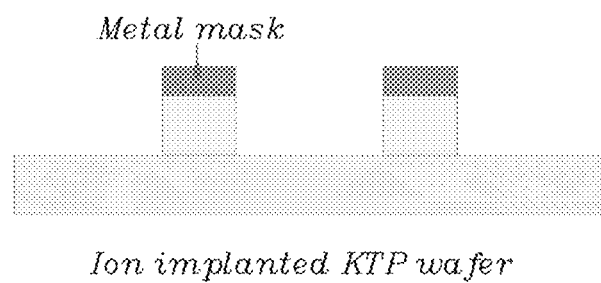

Perform etching on the sample plated with the metal mask from top to bottom using a reactive ion etching equipment. Since the micro-ring part is covered by a metal mask, and the etching rate of the reactive ions on the metal mask is significantly lower than that of the KTP crystal, reactive ion can only etch little fraction of the metal mask and parts of crystal other than the micro-ring, as shown in FIG. 8.

Here, reactive ions are the mixed gas of argon and sulfur hexafluoride.

Step 6: Final Processing

Figure 9:
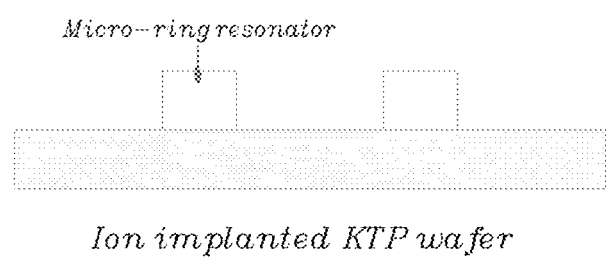

Dissolve the remaining metal mask with a chemical corrosion solution; the remaining part of ion-implanted KTP crystal is a micro-ring resonator structure, as shown in FIG. 9.

Here, the chemical corrosion solution is one of hydrogen peroxide (to dissolve Aluminum) or a mixed solution of 200 grams of cerium ammonium nitrate, 35 milliliters of acetic acid and 1 liter of water (to dissolve chromium).

Embodiment 2

Figure 10:
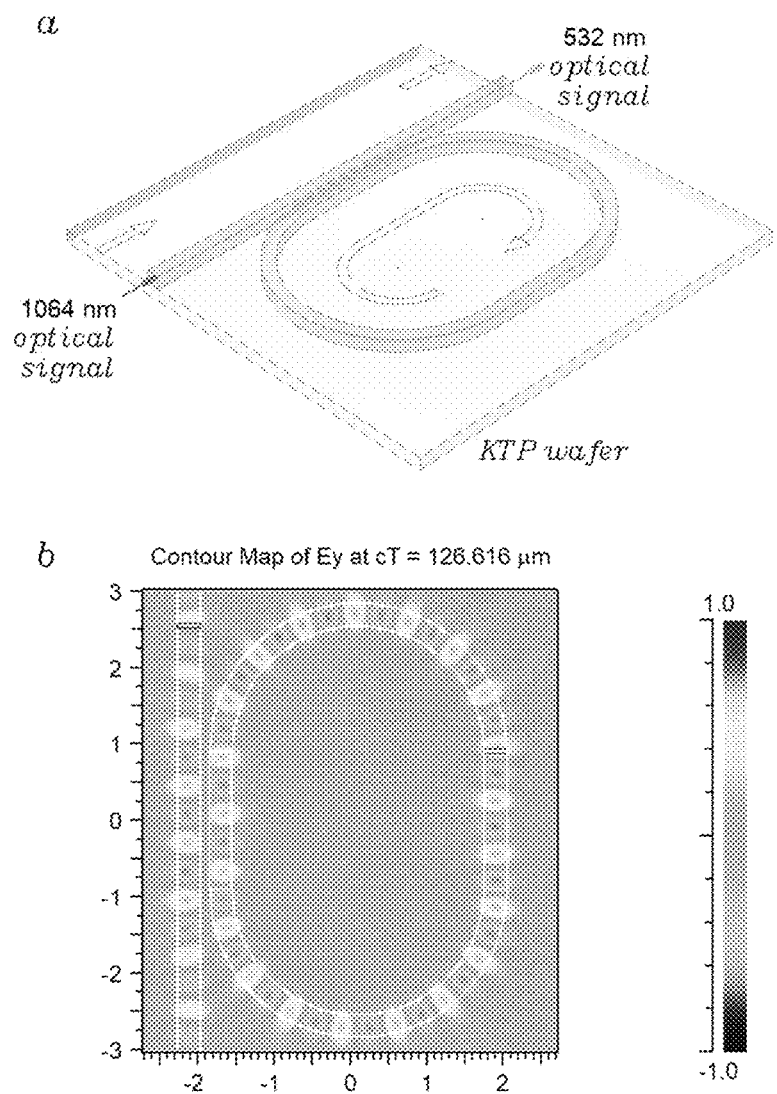
FIG. 10 (a) is a schematic diagram of the frequency doubling process of the 1064 nm laser of the KTP micro-ring resonator.

As shown in FIG. 10, this example demonstrates the frequency doubling (second harmonic generation) within the micro-ring resonator at the waveband of 1064 nanometer. The top of FIG. 10 is a schematic diagram of the 1064 nm frequency doubling in the micro-ring resonator, and the arrow indicates the direction of light propagation.

When the KTP crystal has been treated with proper phase matching (e.g., cut along a specific angle, when $\theta=90°$, $\varphi=23.5°$, type II birefringent phase matching can be realized), it will satisfy the phase matching condition of nonlinear frequency doubling. At this time, when the 1064 nm laser passes through the straight waveguide, it will be coupled into the micro-ring resonator in the form of evanescent wave, cycle back and forth in the resonator, oscillate, and be continuously converted into frequency doubled light of around 532 nm in the propagation path.

The generated frequency doubled light will also be coupled into the straight waveguide in the form of evanescent wave, and finally optical signals around 532 nm will be output. Simulation result of transmission mode of 1064 nm laser oscillating in the KTP micro-ring resonator are shown in the bottom of FIG. 10.

Since KTP has a high optical damage threshold, the output power of frequency doubled optical signal can be improved to the order of milliwatts. Meanwhile, the light circulates back and forth in the micro-ring for many times, making full use of the nonlinear response characteristics of the material. Compared with that of a straight waveguide, the frequency doubling light conversion efficiency of the micro-ring can be increased by several tens of times or more.

The basic principles, main features and advantages of the present invention have been shown and described above. Technical personnel in this industry should understand. The above-mentioned embodiments and the description in the specification only illustrate the principle of the present invention. Without departing from the spirit and scope of the present invention, the present invention will have various changes and improvements. These changes and improvements should fall within the scope of the claimed invention. The scope of protection claimed by the present invention is defined by the appended claims and their equivalents.

What is claimed is:

1. A method for fabricating a KTP nonlinear racetrack micro-ring resonator, comprising the following steps:
    performing surface polishing operations on a KTP wafer; and cleaning and storing the KTP wafer;
    taking out the KTP wafer, accelerating ions by an ion accelerator, and implanting the ions into the KTP wafer to form an isolated layer with decreased refractive index below a surface of the KTP wafer, wherein a part above the isolated layer is a waveguide layer;
    spin-coating a layer of photoresist on the surface of the KTP wafer, transferring a two-dimensional pattern of a micro-ring resonator to the photoresist, with an electron beam exposure equipment, to achieve a sample to be processed;
    depositing a layer of metal on the sample with an evaporation deposition coating system, soaking and cleaning the sample with pure acetone to remove excess photoresist, to transfer the two-dimensional pattern of the micro-ring resonator to the metal and form a metal mask plated on the sample;
    performing etching on the sample plated with the metal mask from top to bottom using a reactive ion etching equipment, wherein the micro-ring part is covered by the metal mask, an etching rate of the reactive ions on the metal mask is lower than that of the KTP crystal, and reactive ion etching removes part of the metal mask and part of crystal other than the micro-ring; and
    dissolving a remaining part of the metal mask with a chemical corrosion solution wherein the remaining part of ion-implanted KTP crystal is a micro-ring resonator structure.

2. The method of claim 1, wherein a type of ions is carbon or oxygen ions.

3. The method of claim 1, wherein a thickness of the photoresist is 300-600 nm.

4. The method of claim 1, wherein the metal is aluminum or chromium.

5. The method of claim 1, wherein the reactive ions are produced from mixed gas of argon and sulfur hexafluoride.

6. The method of claim 1, wherein the chemical corrosion solution is hydrogen peroxide or a mixed solution of 200 grams of cerium ammonium nitrate, 35 milliliters of acetic acid and 1 liter of water.

* * * * *